United States Patent
Kutaragi et al.

(10) Patent No.: US 6,650,610 B1
(45) Date of Patent: Nov. 18, 2003

(54) DISK DEVICE

(75) Inventors: Ken Kutaragi, Tokyo (JP); Shigehisa Miyasaka, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 303 days.

(21) Appl. No.: 09/691,404

(22) Filed: Oct. 18, 2000

(30) Foreign Application Priority Data

Oct. 18, 1999  (JP) .......................................... P11-295384

(51) Int. Cl.⁷ .............................................. G11B 17/04
(52) U.S. Cl. ..................................................... 369/75.2
(58) Field of Search ................................ 369/75.1–77.2

(56) References Cited

U.S. PATENT DOCUMENTS

| | | | | |
|---|---|---|---|---|
| 5,883,870 A | * | 3/1999 | Akiba et al. | 369/77.1 |
| 6,111,838 A | * | 8/2000 | Akiba | 369/77.1 |
| 6,215,753 B1 | * | 4/2001 | Matsumoto | 369/77.2 |
| 6,421,312 B1 | * | 7/2002 | Liao et al. | 369/77.1 |

FOREIGN PATENT DOCUMENTS

| | | | |
|---|---|---|---|
| JP | 5-342732 A | * | 12/1993 |
| JP | 6-68574 | | 3/1994 |
| JP | 6-251479 | | 9/1994 |
| JP | 6-333311 | | 12/1994 |
| JP | 7-14277 | | 1/1995 |
| JP | 8-17118 | | 1/1996 |
| JP | 8-180629 | | 7/1996 |
| JP | 08-339659 | | 12/1996 |
| JP | 9-69282 | | 3/1997 |
| JP | 10-106096 A | * | 4/1998 |
| JP | 10-116458 | | 5/1998 |
| JP | 10-143966 | | 5/1998 |
| JP | 11-162062 | | 6/1999 |
| JP | 11-238274 | | 8/1999 |
| JP | 11-238277 A | * | 8/1999 |
| JP | 11-238278 | | 8/1999 |
| JP | 11-259940 | | 9/1999 |

* cited by examiner

Primary Examiner—William Klimowicz
(74) Attorney, Agent, or Firm—Katten Muchin Zavis Rosenman

(57) ABSTRACT

A disk device that can accommodate disks of different diameter sizes and can be used in the horizontal or vertical orientation is provided with a disk tray on which an optical disk is placed, a chucking member that holds an optical disk in place at its center, and a drive motor that rotates the chucking member and is installed on a base member, which is rotatably supported inside the main body of the disk device. The chucking member is movable with the disk tray during the inward and outward movement of the disk tray with respect to the main body of the disk device, while the drive motor is also moved into and out of engagement with the chucking member as the disk tray moves into and out of the main body of the disk device.

11 Claims, 4 Drawing Sheets

DISK DEVICE

FIELD OF THE INVENTION

This invention concerns a disk device that has a disk tray onto which a disk for recording and/or for playback is placed and retained in the horizontal or vertical position, and that loads said disk into a main body of the device, for use, for example, for CD, DVD, and other optical disk players or for CD-ROM, DVD-ROM, and other disk drives.

BACKGROUND OF THE INVENTION

Long known as disk devices for CD, DVD, and other optical disk drives, etc. are disk devices in which a disk, which is an information recording medium, is inserted into a depression on a disk tray placed approximately horizontally, and said optical disk is loaded by accommodating the disk tray inside the device main body.

With such a disk device, it suffices merely to place the optical disk in the disk tray, making it possible to simply load the disk inside the main body and to place in the disk tray optical disks of different diameters, such as 8 cm and 12 cm. Such disk device, besides being used in the horizontal orientation, in which the disk tray is horizontal, is also sometimes used in the vertical orientation, in which the disk tray is vertical.

If the disk device is oriented vertically, it is not possible, just by inserting an optical disk into the depression, to hold the optical disk on the disk tray. Therefore, as disclosed in Japanese unexamined patent H6-251479 [1994], a disk device has been proposed that has a disk tray equipped with holding members that hold the optical disk loosely clamped against the outer circumference of the depression from outside its surface. However, in said prior art disk device, the holding members are fixed on the disk tray, so nothing can be held by the holding members except an optical disk of the prescribed diameter size, such as the 12-cm size used for ordinary CDs, etc., with the problem that when using the disk device in vertical orientation, it is difficult to use an optical disk of a different diameter size, such as 8 cm.

SUMMARY OF THE INVENTION

The purpose of this invention is to provide a disk device that can use disks of different diameters and can be used in the horizontal or vertical orientation. In order to achieve said purpose, the disk device of the present invention, which has a disk tray into which is placed a disk, has a chucking member that holds said disk in place at its center hole part and a drive motor that turns the chucking member, The drive motor is installed on a base member that is rotatably supported inside said device main unit, and this base member, along with the advancement and retraction of said disk tray with respect to the device main body, rotates so as to cause said drive motor to approach toward and retreat from said disk tray. The chucking member is constructed so as to be exposed outside the device main body along with the advancement and retraction of said disk tray with respect to the device main body along with the loading of said disk.

DETAILED DESCRIPTION OF THE PREFERRED EMBODIMENTS

Figure 1:
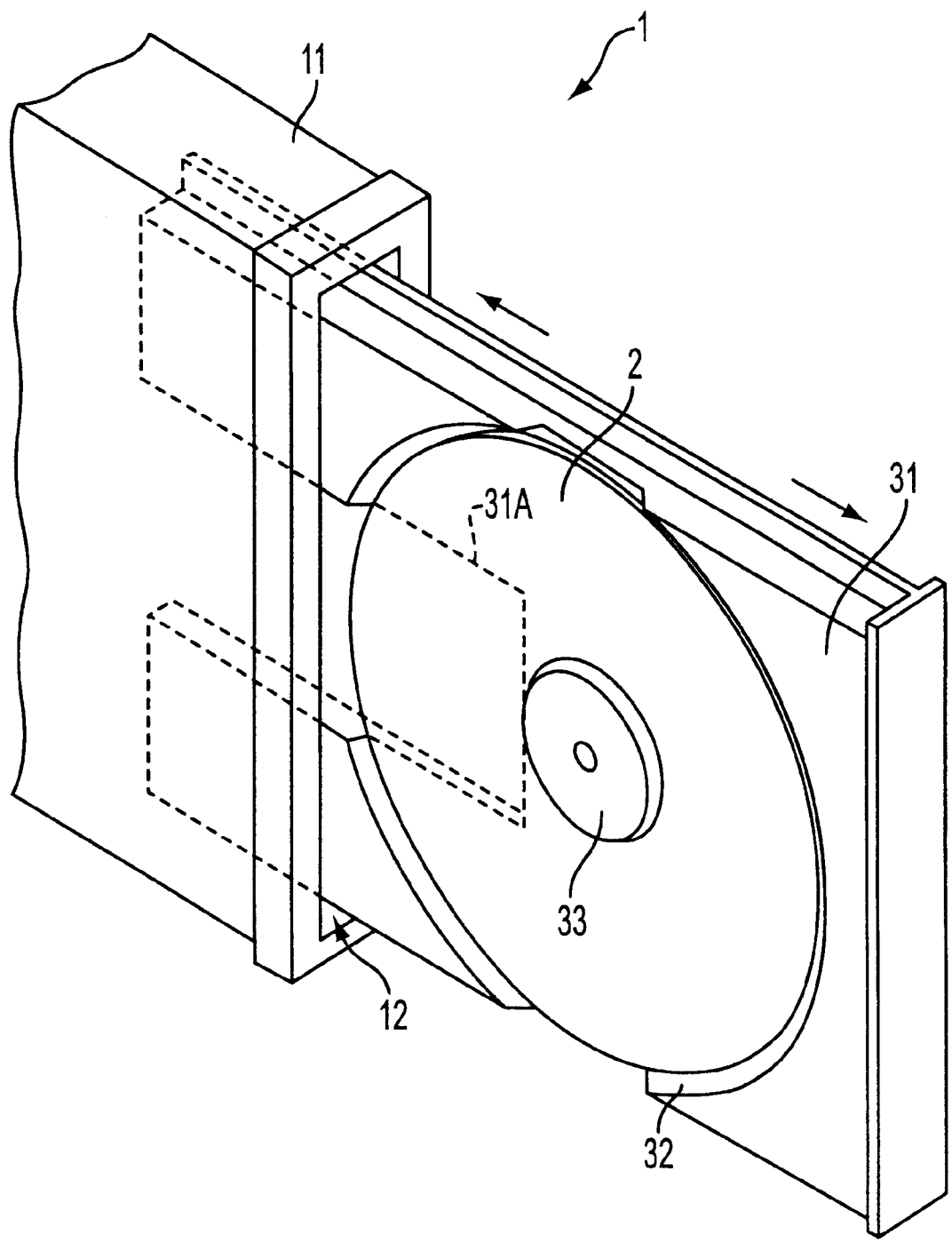
FIG. 1 is a simplified perspective view showing the structure of the disk device of an embodiment of the invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Shown in FIG. 1 is an embodiment of the disk device 1 of the present invention, which plays optical disk 2 such as a CD-ROM or DVD-ROM disk, which comprises device main body 11, inside which an optical pickup unit (see FIG. 2) is accommodated, and disk tray 31, by which optical disk 2 is loaded into device main body 11. As shown in the cross-sectional view of FIG. 2, device main body 11 has outer case 12, in which is formed an opening 12A for insertion and withdrawal of disk tray 31, spindle motor 13, which is a drive motor for rotating disk 2 placed on disk tray 31, and optical pickup unit 15, which reads the information recorded on optical disk 2.

Figure 3:
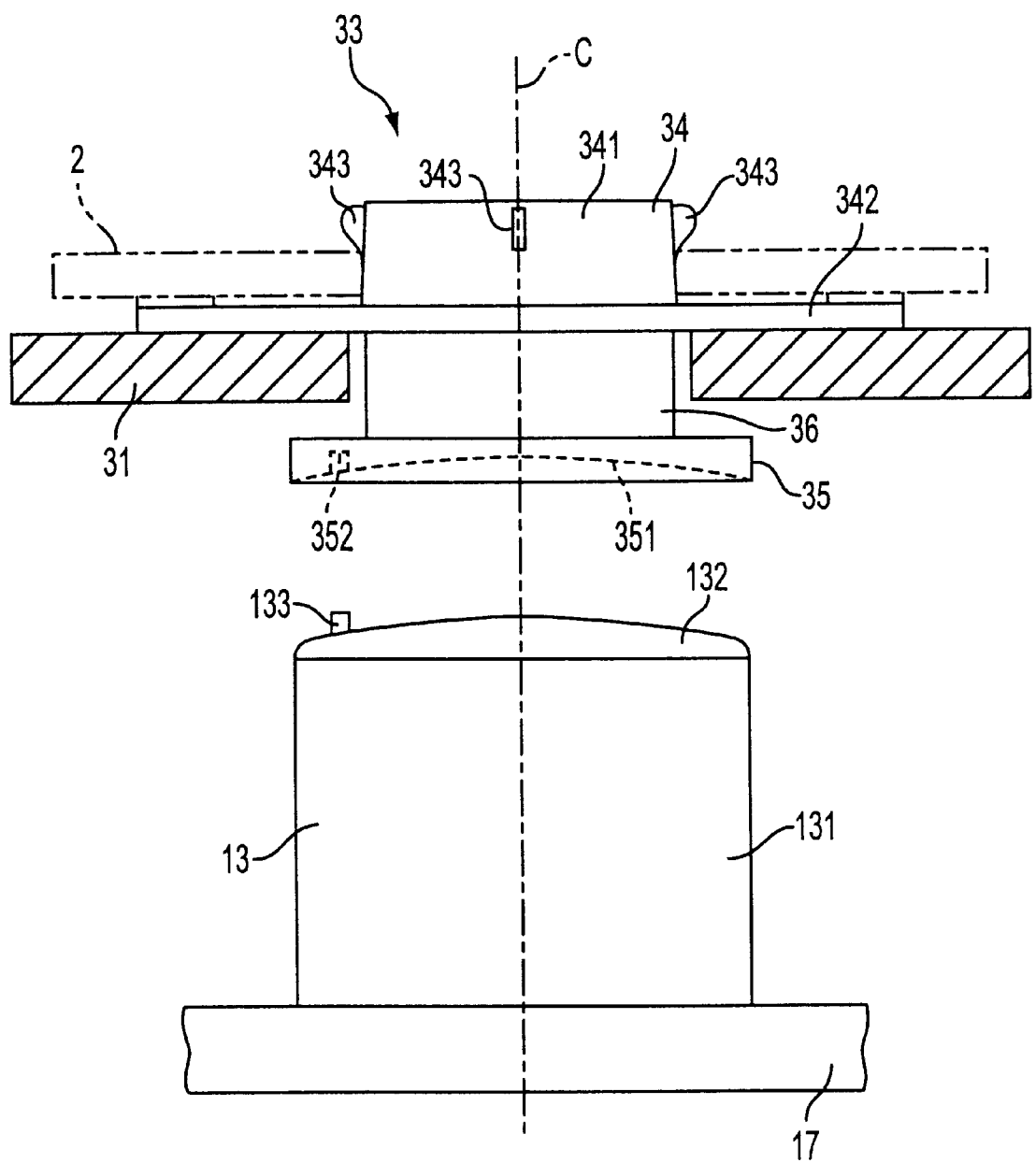
FIG. 3 is a side view showing the structure of the tight contact between the chucking member and the drive motor that constitute the disk device of the invention.

As shown in FIGS. 1 and 3, spindle motor 13 has a motor main body (not pictured), rotor case 131, in which the motor main body is housed, rotating plate 132, which is attached to the rotation shaft of the motor main body and is exposed on the upper surface of rotor case 131, and protrusion 133, which protrudes on the upper surface part of this rotating plate 132. Rotating plate 132 is made of a magnetic substance that has magnetic force, and the upper surface of rotating plate 132 that makes tight contact with chucking member 33, which is described below, is in the shape of a roughly spherical surface whose vertex is axis of rotation C (see FIG. 3). Protrusion 133 is biased outwardly by a spring (not pictured) provided on the rear surface (not pictured) of rotating plate 132, such that when a force is applied against the protrusion 133 it disappears into the surface of rotating plate 132, and when the force is released, the spring causes it to protrude outward from the surface of rotating plate 132.

Figure 2:
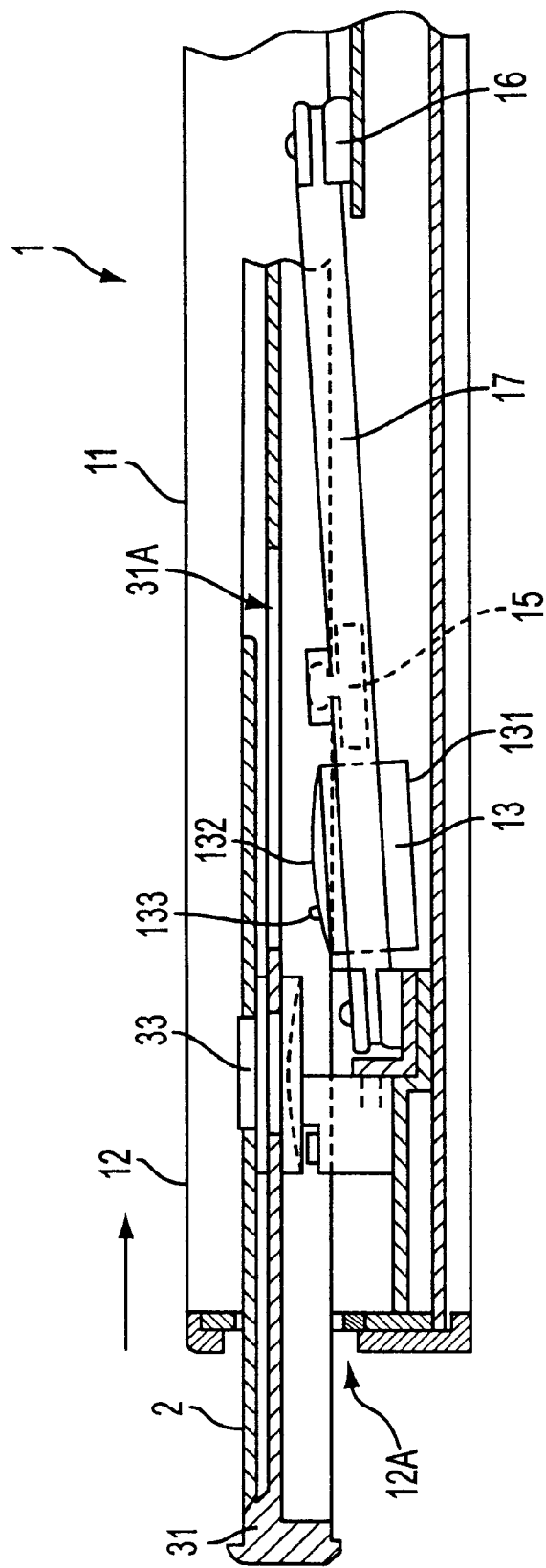
FIG. 2 is a cross-sectional view of the internal structure of the disk device of the invention.

As shown in FIG. 2, spindle motor 13 and optical pickup unit 15 are positioned on base member 17, which is rotatably supported by rotation fulcrum 16 in the back of device main body 11. Together with the rotation of this base member 17, spindle motor 13 and optical pickup unit 15 move so as to approach toward and retreat from disk tray 31. Also, although not pictured in FIG. 2, a drive mechanism is provided inside device main body 11 that causes base member 17 to rotate about rotation fulcrum 16 as disk tray 31 is inserted and withdrawn through opening 12A. As shown in FIG. 1, disk tray 31 has a circular depression 32, which is formed to correspond to the shape of an optical disk 2, and chucking member 33, which holds it in the middle of the tray surface in a loosely clamped state. In approximately the center part of disk tray 31 is formed opening 31A (FIGS. 1 and 2), into which optical pickup unit 15 is inserted when disk tray 31 is inserted into device main body 11.

As shown in FIG. 3, chucking member 33 further comprises disk mounting unit 34 on the upper surface of disk tray 31, and motor connection unit 35 on the lower surface of tray 31, with a cylindrical connection member 36 extendable therebetween and insertable through a hole formed in disk tray 31. A clearance of about 1 mm is preferably provided between the hole formed in disk tray 31 and connection member 36. The spacing between disk mounting unit 34 and motor connection unit 35 is preferably larger than the thickness of disk tray 31. Prior to contact with the spindle motor 13, the chucking member 33 is held by the disk tray 31 between the disk mounting unit 34 and motor connection unit 35. When chucking member 33 makes tight, operational contact with spindle motor 13, chucking member 33 is released from disk tray 31 and is rotated by spindle motor 13.

Disk mounting unit 34 has insertion unit 341, onto which the center hole of optical disk 2 is inserted, disk table unit 342, which is provided on the lower end part of insertion unit 341 for support of the lower surface of optical disk 2, and protrusion units 343, which are provided on the upper side surfaces of insertion unit 341 for holding inserted optical disk 2 against disk table unit 342. Protrusion units 343 are preferably biased to protrude and retract with respect to the side surface of insertion unit 341. When optical disk 2 is placed on disk tray 31, protrusion units 343 retract into the insertion unit 341 and allow the center hole of optical disk 2 to pass by. After the optical disk 2 has been placed on the disk table unit 342, the protrusion units 343 once again protrude outward from the insertion unit 341, urging the optical disk 2 downward against the disk table unit 342 from above.

It will be understood that because the chucking member 33 becomes exposed outside of device main body 11 together with the advancement and retraction of disk tray 31 with respect to device main body 11, optical disk 2 can be held on the disk tray by mounting the center hole of optical disk 2 on the exposed chucking member 33. Therefore optical disk 2 can be held securely on the disk tray regardless of whether disk device 1 is used in the horizontal orientation or in the vertical orientation. Furthermore, because only chucking member 33 is exposed from the outside of device main body 11, the additional weight of disk tray 31, including chucking member 33, can be minimized, and no excess load is imposed on the drive mechanism that performs the operation of advancement and retraction of disk tray 31 with respect to device main body 11.

Figure 4:
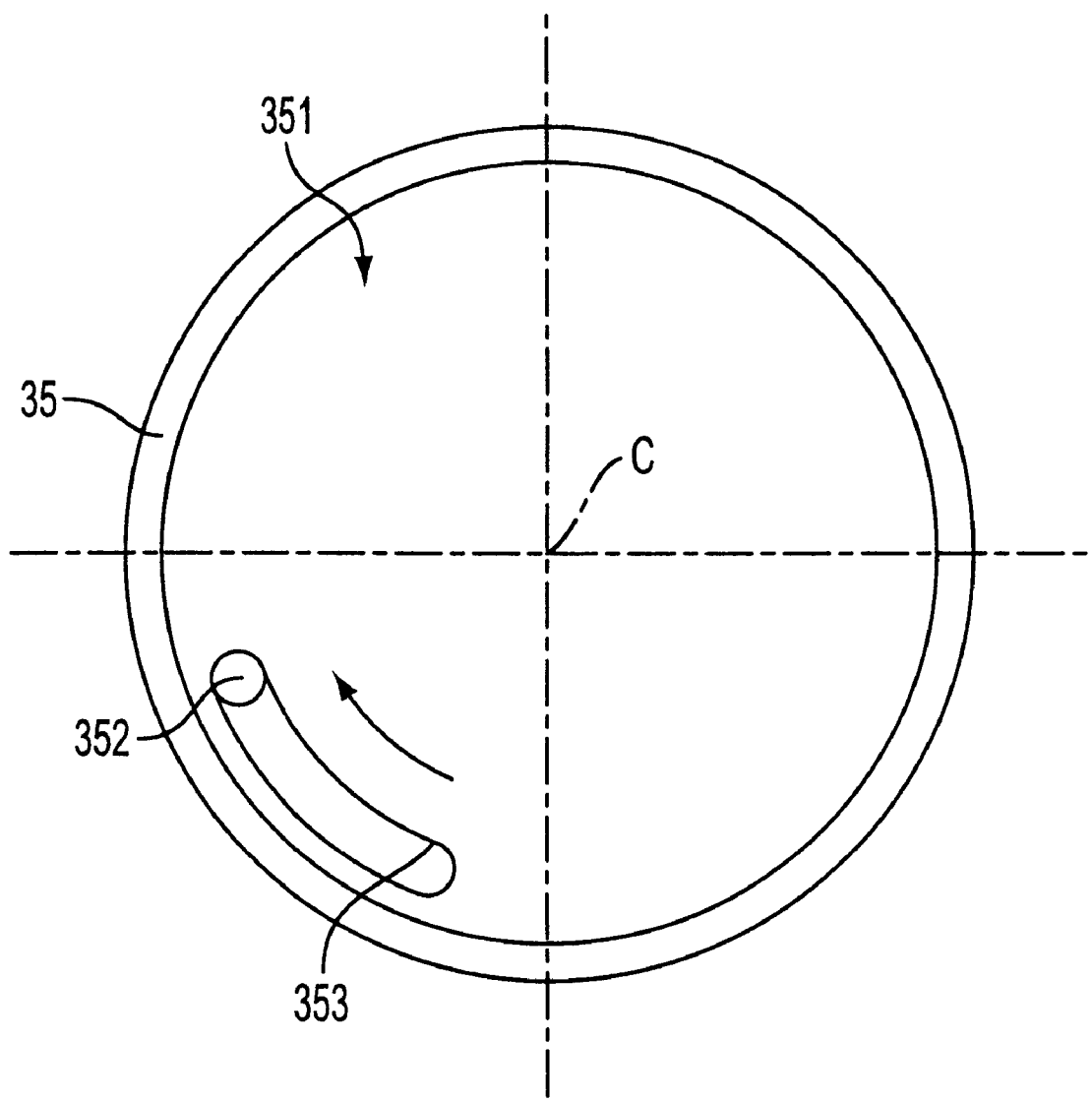
FIG. 4 is a plan view showing the structure of the base surface part of the chucking member that makes up the disk device of the invention.

Motor connection unit 35 is preferably made of sheet metal, and chucking member base surface 351, which makes tight contact with rotating plate 132 of spindle motor 13, preferably constitutes a concave curved-surface that corresponds to the curved-surface of rotating plate 132. The lowest part of the concave curved surface of chucking member base surface 351 corresponds to the center of rotation of chucking member 33. Formed on chucking member base surface 351, in a position corresponding to protrusion 133 on rotating plate 132, is depression 352. As shown in FIG. 4, guide groove 353 is formed in depression 352 along the rotation direction of chucking member 33, being shallowest farthest from depression 352 along the direction of rotation and deepest in the position near depression 352. In other words, when protrusion 133 makes tight contact with motor connection unit 35, it is guided by guide groove 353 until it engages with depression 352.

The operation of the disk device 1 of the present invention is fairly straightforward. When an eject button (not pictured) provided on the front panel of device main body 11 is pressed, base member 17 inside device main body 11 rotates, spindle motor 13 and optical pickup unit 15 move away from disk tray 31, and disk tray 31 is ejected from main body 11. The center of optical disk 2 is then advanced over insertion unit 341, causing protrusion units 343 to temporarily retract with the passage of the disk 2 until disk 2 is seated on the disk table unit 342 and is held there by the protruding units 343. After the disk 2 has been mounted on the chucking member 33, the eject button is operated again or disk tray 31 is pressed in with a prescribed force and disk tray 31 is automatically pulled in by the drive mechanism inside device main body 11. The base member 17 then rotates, bringing spindle motor 13 and optical pickup unit 15 near disk tray 31.

When spindle motor 13 approaches disk tray 31, chucking member 33 is magnetically attracted to rotating plate 132, causing rotating plate 132 and chucking member base surface 351 to make tight contact. After rotating plate 132 and chucking member 33 make tight contact, spindle motor 13 begins to rotate, and in conjunction with this the chucking member 33 also rotates, and chucking member 33, by means of roughly spherical-surface-shaped rotating plate 132, moves so that its center of rotation corresponds to the position of the axis of rotation of spindle motor 13. Protrusion 133 then engages guide groove 353, and together with the rotation of rotating plate 132, it is guided by guide groove 353 until it engages with depression 352.

The disk device of the present invention provides for an efficient construction and operation of the disk tray and the operational components within the device main body. The use of a chucking member disposed on the disk tray enables a disk to mounted in the horizontal or vertical direction. Furthermore, because only the chucking member is exposed from the outside of device main body, the weight of the disk tray can be minimized, requiring no excess load imposed on the drive mechanism that advances and retracts the disk tray with respect to device main body.

Locating the chucking member on the disk tray also results in a simplified construction of the device main body. For example, because base member rotates so as to draw nearer to and farther from spindle motor and disk tray, spindle motor is prevented from interfering with the disk tray and the operation of advancing and retracting the disk tray with respect to device main body can be done quickly and efficiently. Also, because the approach and separation of the spindle motor is done by rotation of base member, the internal structure of the disk device is simplified, and the disk device can be made smaller and lighter. Furthermore, because the chucking member makes tight contact with rotating plate by magnetic force and rotates in synchronization with the rotation of the motor main body, the structure of the disk device and the spindle motor in particular is simplified by virtue of the automatic connection between the chucking member and the motor.

In addition, because the connection between the chucking member and the spindle motor occurs along mating spherical surfaces 132 and 351, the chucking member will be guided to the position that is most stable for the rotation movement. In other words, the center of the rotational movement of chucking member can be guided to a position that corresponds to the axis of rotation of the motor main body, thereby assuring a proper rotation of an optical disk held in chucking member. Furthermore, because a protrusion is provided on rotating plate and a depression is formed in chucking member base surface, when rotating plate and chucking member base surface make tight contact, they engage mechanically, guided by a guide groove on the chucking member, and resist the force of spindle motor in the rotational direction. Therefore, the rotation movement of spindle motor can be transmitted to chucking member in proportion to the tight contact due only to the magnetic force, and without the occurrence of any sliding therebetween.

Moreover, this invention is not limited to the aforementioned embodiments, but can include the following modifications, which are not meant to be interpreted in any limiting sense.

Namely, in the above embodiment, the tight contact between spindle motor and chucking member is effected by magnetic force. However, the tight contact between the two may be effected by some other mechanical engagement not incorporating magnetic means. Also, in the above embodiment, the tight contact between spindle motor and chucking member is effected by the mechanical engagement of protrusion and depression, but it is not necessarily limited to this. Namely, the tight contact between the two may be effected exclusively by magnetic force, without any mechanical engagement. And in this case, the occurrence of sliding, etc. can be suppressed by increasing the friction between rotating plate and chucking member base surface. Other engagement means are also contemplated.

In addition, the disk device of the present invention may have a structure and shape other than what is disclosed herein, as long as it achieves the purpose of this invention.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

We claim:

1. A disk device comprising:
   a) a main body having a base member;
   b) a disk tray loadable into said main body for placement of a disk having a central portion;
   c) a chucking member having an axis of rotation and provided on said disk tray for holding said disk in place at its central portion; and
   d) a drive motor provided on said base member for rotational engagement with said chucking member,
   e) wherein said base member is rotatably supported inside said main body for movement of said drive motor toward said disk tray and away from said disk tray during advancement and retraction of said disk tray with respect to said main body;
   f) wherein said chucking member is constructed so as to be exposed outside of said main body along with the advancement and retraction of said disk tray with respect to said main body;
   g) wherein said drive motor further comprises a motor main unit having an axis of rotation, a rotation shaft and a rotating plate, wherein said drive motor is coupled to said motor main unit and to said rotation shaft and said rotating plate that makes tight contact with said chucking member, and when said disk tray is accommodated in said main body said chucking member makes tight contact with said rotating plate by magnetic force and rotates synchronously with the rotation of said motor main unit;
   h) wherein said rotating plate further comprises a spherical surface having a vertex at a position corresponding to the axis of rotation of said motor main unit, and said chucking member further comprises a base surface that makes tight contact with said rotating plate, said base surface being in the shape of a concave curved surface corresponding to said rotating plate, and the lowest part of said base surface corresponding to the axis of rotation of said chucking member; and
   i) further comprising a protrusion provided on said rotating plate and adapted for engagement with a depression provided in said base surface of said chucking member.

2. A disk device as described in claim 1, further comprising a guide groove provided on said base surface of said chucking member for guiding said protrusion into said depression as said chucking member rotates.

3. A disk tray for accommodating a disk, said disk having a central portion and an undersurface, said disk tray for use with a disk device that operates with such disk, said disk was comprising:
   a) a seating surface, a rear surface and a thickness defined therebetween,
   b) a chucking member held between said seating surface and said rear surface, said chucking member further comprising an upper portion adapted for the passage of the central portion of a disk and a lower portion adapted for engagement with a drive unit within the disk device, and
   c) holding members disposed along the upper portion of said chucking member for horizontally or vertically retaining a disk on said disk tray,
   d) wherein said lower portion of said chucking member further comprises a concave surface dimensioned to mate with a convex surface on a drive unit in said disk device, and
   e) wherein said concave surface further comprises a guide groove for engagement by a drive unit in said disk device.

4. A disk tray in accordance with claim 3, wherein said holding members are biased to protrude outwardly from said chucking member, said holding member being further adapted to retract into said chucking member with the passage of a disk thereover.

5. A disk tray in accordance with claim 3, wherein said chucking member further comprises a disk table member disposed between said seating surface and said holding members for supporting the undersurface of a disk passed over and retained by said holding members.

6. A disk tray in accordance with claim 3, wherein said guide groove terminates in a depression for engagement by a protrusion on a drive unit in said disk device.

7. A disk tray in accordance with claim 3, wherein said lower portion of said chucking member is adapted to magnetically engage a drive unit in said disk device.

8. A disk device comprising:
   a) a mainbody;
   b) a disk tray loadable into said main body, said disk tray being adapted to receive a disk thereon; and
   c) a drive member for rotation of a disk seated on said disk tray;
   d) wherein said drive member further comprises a first drive unit disposed within said main body and a second drive unit disposed on said disk tray,
   e) wherein said first unit comprises a drive motor and said second drive unit comprises a chucking member,
   f) wherein said chucking member has a concave engagement surface that engages a convex engagement surface on said dive motor, and g) wherein said drive motor engagement surface has a protrusion that engages a depression on said chucking member engagement surface to assure synchronous rotation of said drive motor with said chucking member.

9. A disk device in accordance with claim 8, wherein said second drive unit is movable with said disk tray into and out of said main body.

10. A disk device in accordance with claim 8, wherein said first and second drive units are magnetically attracted to each other.

11. A disk device in accordance with claim 8, wherein said protrusion on said drive motor engagement surface is spring-biased.

* * * * *